US012083051B1

(12) United States Patent
Butler et al.

(10) Patent No.: US 12,083,051 B1

(45) Date of Patent: Sep. 10, 2024

(54) MASSAGE PRACTITIONER STABILIZING DEVICE

(71) Applicant: Bodywork Unbound LLC, Rochester, NY (US)

(72) Inventors: Karen M. Butler, Rochester, NY (US); Gage Olschewski, Ogden, NY (US)

(73) Assignee: Bodywork Unbound LLC, Rochester, NY (US)

( * ) Notice: Subject to any disclaimer, the term of this patent is extended or adjusted under 35 U.S.C. 154(b) by 0 days.

(21) Appl. No.: 18/602,987

(22) Filed: Mar. 12, 2024

(51) Int. Cl.

| | |
|---|---|
| ***A61H 13/00*** | (2006.01) |
| ***A47C 21/00*** | (2006.01) |
| ***A61G 13/00*** | (2006.01) |
| ***A61G 13/10*** | (2006.01) |
| ***A61H 37/00*** | (2006.01) |

(52) U.S. Cl.
CPC ............ *A61G 13/101* (2013.01); *A47C 21/00* (2013.01); *A61G 13/009* (2013.01); *A61H 37/00* (2013.01); *A61H 2201/1253* (2013.01); *A61H 2203/0468* (2013.01)

(58) Field of Classification Search
CPC .... A61G 13/00; A61G 13/101; A61G 13/009; A47C 21/00; A61H 37/00; A61H 2201/1253; A61H 2203/0468
See application file for complete search history.

(56) References Cited

U.S. PATENT DOCUMENTS

| | | | | |
|---|---|---|---|---|
| 10,959,897 | B2 | 3/2021 | Tsukayama et al. | |
| 11,612,542 | B2 | 3/2023 | Tsukayama et al. | |
| 11,737,940 | B2 | 8/2023 | Tsukayama et al. | |
| 2007/0087920 | A1* | 4/2007 | Dachraoui | A63B 21/0552 482/121 |
| 2012/0270709 | A1* | 10/2012 | Howard | A63B 21/00047 482/140 |
| 2017/0087396 | A1* | 3/2017 | Gold | A63B 21/002 |
| 2017/0333742 | A1* | 11/2017 | Reese | A63B 21/0557 |
| 2020/0237616 | A1* | 7/2020 | Tsukayama | A61G 13/009 |

* cited by examiner

*Primary Examiner* — Fredrick C Conley

(74) *Attorney, Agent, or Firm* — Jong Patent Firm; Cheng Ning Jong; Tracy P. Jong

(57) ABSTRACT

A base member for removably securing a flexible member coupled to a table having a frame element, the base member including a base, at least three anchors configured to extend from at least three different locations on the base to delineate an area, and an aperture through which the flexible member is disposed to removably secure the flexible member, the aperture is disposed in the base, wherein the table is positioned with the frame element disposed upon the area to restrict movement of the table relative to the base member.

14 Claims, 11 Drawing Sheets

MASSAGE PRACTITIONER STABILIZING DEVICE

BACKGROUND OF THE INVENTION

1. The Field of the Invention

The present invention relates to a massage practitioner stabilizing device. More specifically, the present invention is directed to a base member for removably securing a flexible member, the base member coupled to a massage table having a frame element, to stabilize a massage practitioner giving a patient a foot massage.

2. Background Art

In the realm of massage therapy, practitioners have increasingly adopted innovative techniques, such as Ashiatsu or barefoot massage, where the therapist utilizes their feet to apply pressure to the client's body. While these techniques offer unique therapeutic benefits, they present distinct challenges when implemented on conventional massage tables that were originally designed to accommodate hand-based massage methods. Traditional massage tables may lack the necessary structural features to provide stable support for the massage practitioner when applying pressure with their feet. This deficiency can lead to an increased risk of table instability and potential accidents during the massage session that could injure the practitioner and the patient. The nature of foot-based massage often requires structural support for balance. As a result, massage practitioners frequently use either an overhead rope fastened to an end of a room for support or a set of overhead bars that are either mounted to the ceiling or part of a bulky apparatus to administer a foot-based massage. This apparatus lacks portability, and is less than satisfactory.

Other common problems associated with the existing equipment used to stabilize massage practitioners conducting foot-based massages on a massage table include inadequate table structure to ensure stability of the table when the practitioner is standing on it, and difficulties of the practitioner in maintaining balance and control during the massage session. Existing massage tables often provide limited space for the practitioner to maneuver and position their feet effectively. This limitation can hinder the practitioner's ability to execute foot-based techniques with precision and control, compromising the quality of the massage. The standard design of massage tables may not align with the ergonomic needs of practitioners engaging in foot-based massage techniques. For example, uncomfortable body misalignment can result in discomfort, fatigue, and potential musculoskeletal issues for the massage practitioner over time. Conventional massage tables may lack the necessary adjustability to accommodate the diverse body sizes and massage styles associated with foot-based techniques. This limitation can hinder the practitioner's ability to customize the equipment to their specific needs, leading to suboptimal performance. Equipment that is difficult to clean or sanitize between clients can pose hygiene risks, potentially leading to the spread of bacteria or infection. If the equipment does not adequately support the client's body during the foot-based massage, it can lead to discomfort or even pain for the client, reducing the effectiveness of the massage and potentially leading to negative feedback or loss of clients.

The need for an innovative stabilization system tailored to the requirements of massage practitioners employing their feet on a massage table is evident. The present invention seeks to address these challenges by providing an improved, adjustable, and ergonomically designed stabilization apparatus that ensures the safety, comfort, and efficiency of massage practitioners engaged in foot-based massage techniques on traditional massage tables.

U.S. patent Ser. No. 10/959,897 to Tsukayama discloses a method of administering a massage that includes employing, by a massage practitioner, a foot of the massage practitioner to deliver force to a patient that is lying on a patient supporting device, and utilizing, by the massage practitioner, a flexible member affixed to patient supporting surface to assist with balance while employing the foot of the massage practitioner to deliver force to the patient. An apparatus is disclosed for adapting a portable massage table having a first portion hingedly connected to a second portion that includes an elongated body extending in a longitudinal direction and at least one clasp attached to the elongated body. The elongated body has a substantially U-shaped cross-sectional configuration using four fasteners to secure the first portion of the portable massage table to the second portion of the portable massage table to prevent movement of the first portion of the portable massage table in relation to the second portion of the portable massage table. The at least one clasp is adaptable for securing a flexible member to the elongated body. In other implementations the conventional fasteners could be clamps, levers, or other similar mechanisms that allow the apparatus to be secured to the underside of the portable massage table. The apparatus employed is rather complex, and the fasteners are eye bolts that are difficult to lock in place, and prone to loosen in use, and this could result in the massage practitioner falling from the table if the flexible member disengages from the massage table.

U.S. Pat. No. 11,612,542 to Tsukayama discloses a foot-based massage method and apparatus for supporting practitioners of foot-based massage techniques that is related to Tsukayama's patent disclosed elsewhere herein. This application employs a portable flat base member to which a flexible member is attached to assist the practitioner with balance while employing the foot of the massage practitioner to deliver force to the patient. The base member is placed on a support surface which can be the floor or support table. The base member has gripping members to keep the base member from moving around on the support surface. A patient support member is placed over the base member for the patient to lie on. This can be a yoga mat or similar small thin flexible mattress. The design of the base member seems unnecessarily complex, and it may not stay immobile when in use by the massage practitioner.

There exists a need for a simpler and improved apparatus for use by massage practitioners to secure a balance aid and there further exists a need for the balance aid to be used with a massage table that is more stably disposed, for the benefit of both the practitioners and patients.

SUMMARY OF THE INVENTION

In accordance with the present invention, there is provided a base member for removably securing a flexible member coupled to a table having a frame element, the base member including:

(a) a base;

(b) at least two anchors configured to extend from at least two different locations on the base to delineate an area; and (c) an aperture through which the flexible member is disposed to removably secure the flexible member, the aperture is disposed in the base, wherein the table is positioned with the frame element disposed upon the area to restrict movement of the table relative to the base member.

In one embodiment, the at least two anchors can be two anchors, three anchors or four anchors. In one embodiment, the base is a plate having a thickness of up to about 0.25 inches. In one embodiment, the aperture includes a diameter and the aperture measures about 1.25-1.50 inches in diameter.

In accordance with the present invention, there is further provided a base member for removably securing a flexible member coupled to a table having a frame element, the base member including:

(a) a base including two side edges, two terminal edges, wherein the two side edges and the two terminal edges together define four corners;
(b) at least two anchors, wherein one of the at least two anchors configured to extend from a first of the two side edges to be disposed at two of the four corners and the other one of the at least two anchors configured to extend from a second of the two side edges; and
(c) an aperture through which the flexible member is disposed to removably secure the flexible member, wherein the table is positioned with the frame element disposed within an area outlined by the at least two anchors to restrict movement of the table relative to the base member.

In one embodiment, the aperture is configured to be disposed at an offset from the one edge from which the protrusion extends. In one embodiment, the base member further includes a ring, where the flexible member includes two ends, each end of the flexible member is tied to the ring to form an infinity loop having a knot disposed on a portion of the infinity loop and formed of the two ends of the flexible member, the infinity loop is configured to be threaded through the aperture with an end of the infinity loop opposite the end the knot is disposed until the threading movement of the flexible member is arrested by at least one of the knot and the ring as the infinity loop continues to be pulled from the end of the infinity loop opposite the end the knot is disposed, the ring is configured to prevent a complete detachment of the flexible member from the ring-base member during use of the flexible member. In one embodiment, the at least one of the at least two anchors is a plate having a broad face parallel to one of the two side edges. In one embodiment, the at least two anchors can be two anchors, three anchors or four anchors. In one embodiment, the base is a plate having a thickness up to about 0.25 inches. In one embodiment, the base includes a plate and the protrusion includes a plate extending substantially co-planarly from the plate. In one embodiment, the aperture includes a diameter and the aperture measures about 1.25-1.50 inches in diameter.

In accordance with the present invention, there is provided a method for enabling the use of a massage table having a frame element, the method including:

(a) securing a flexible member disposed in an infinity loop to an underside of the massage table;
(b) standing, by a massage practitioner, on the massage table;
(c) balancing and applying a downward force to assist with delivery of force to a patient lying on the massage table, by the massage practitioner engaging a portion of the infinity loop; and
(d) using a foot of the massage practitioner to massage the patient.

In one embodiment, the massage table is a foldable massage table. In one embodiment, the foldable massage table is divided in half longitudinally to define the first half and the second half so that the first half and the second half meet halfway between longitudinal sides of the foldable massage table. In one embodiment, the securing step includes securing the flexible member disposed in an infinity loop to a base member including an aperture. In one embodiment, the flexible member comprises a knot, the securing step further comprises disposing the flexible member through the aperture until a movement of the flexible member becomes arrested by the aperture.

An object of the present invention is to provide an improved, adjustable, and ergonomically configured stabilization apparatus that ensures the safety, comfort, and efficiency of massage practitioners engaged in foot-based massage techniques on traditional massage tables.

Another object of the present invention is to provide a base member for removably securing a flexible member coupled to a massage table having a frame element, to allow a massage practitioner to use the flexible member to safely balance while standing on the table while providing a foot massage to a prone or supine patient.

Another object of the present invention is to provide an innovative stabilization system tailored to the requirements of massage practitioners employing their feet on a massage table.

Another object of the present invention is to provide a balance aid securing device suitable for a portable, lightweight, foldable massage table without legs that lies flat on the floor and is stable when the practitioner is applying a foot massage to a client.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—base member
4—base
6—protrusion
8—aperture
10—anchor
12—distance or offset of aperture center from base
14—length of base
16—width of base
18—patient
20—massage table
22—flexible member, e.g., fabric material, e.g., silk
24—practitioner
26—practitioner's hand
28—practitioner's arm
30—half length of base
32—width of anchor
34—height of anchor
36—ring
38—direction in which frame elements of erected massage table is placed atop base
40—knot
42—frame element
44—edge of anchor
46—hinge
48—first portion of table
50—second portion of table
52—direction of flexible member insertion into base member
54—step of securing flexible member disposed in infinity loop to underside of massage table
56—step of standing, by a massage practitioner, on massage table
58—step of balancing and applying downward force to assist with delivery of force to patient lying on massage table, by the massage practitioner engaging portion of infinity loop
60—step of using foot of massage practitioner to massage patient
62—side or longitudinal edge
64—direction in which flexible member infinity loop is disposed through aperture

PARTICULAR ADVANTAGES OF THE INVENTION

The present base member provides an innovative stabilization system tailored to the requirements of massage practitioners employing their feet on a massage table while providing a foot massage to a client. It discloses a portable, light-weight, foldable massage table without legs that lies flat on the floor and is stable when the practitioner is applying a foot massage to a client. It provides a simple base member for removably securing a flexible member coupled to a massage table having a frame element, to allow a massage practitioner to use the flexible member to safely balance while standing on the table while providing a foot massage to a prone or supine patient.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
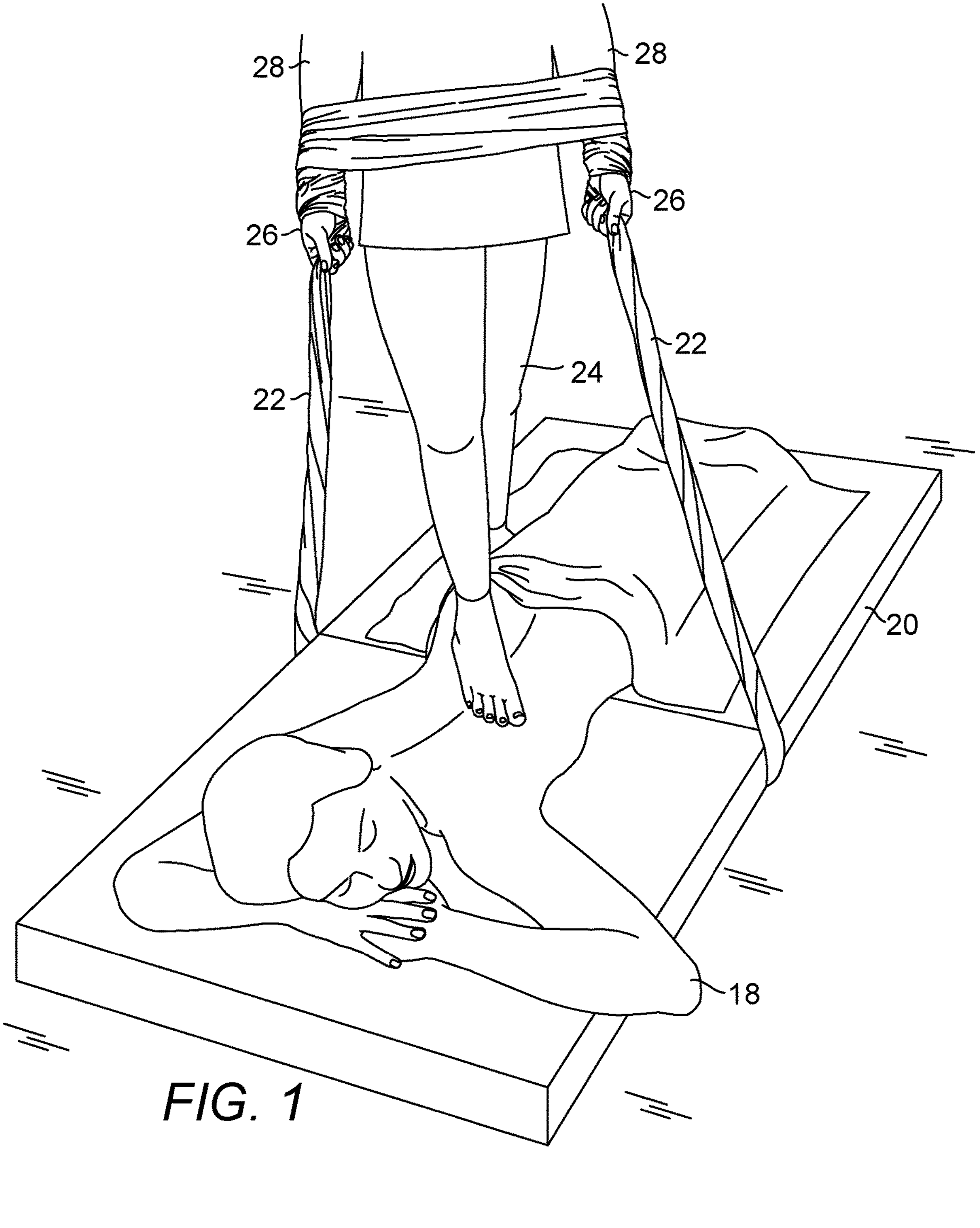
FIG. 1 is a diagram depicting a massage practitioner applying massage techniques to a patient with the aid of an apparatus secured to a massage table.

FIG. 1 shows a massage practitioner 24 using her feet to administer a foot-based massage to a patient 18 lying on a massage table 20. During the massage, the patient 18 is positioned substantially parallel to the massage table 20 and lays in the direction in which the massage table 20 extends, and the massage practitioner 24 stands on the massage table 20 disposed on a floor, therefore not risking her own safety as the massage table 20 is not significantly elevated from the floor. In the illustrated, non-limiting example, the patient 18 is positioned in a prone position while the massage is administered by the massage practitioner 24. The massage can also be administered by the massage practitioner 24 while the patient 18 is in a supine position. During a foot massage, the flexible member 22 serves as a balance aid for the practitioner 24 when wrapped around her arms 28 and gripped by her hands 26. As shown in FIG. 1, the massage practitioner 24 supports the bulk of her weight on one leg, which is resting on the massage table 20 adjacent to the patient 18 and the massage is administered to the patient 18 using the foot of her non-supporting leg while the practitioner is in the standing position. It is also possible for the massage practitioner 24 to simultaneously use both of her feet to deliver the massage. In order to assist the massage practitioner 24 in maintaining her balance while administering the massage, a flexible member 22 is removably affixed to the massage table 20. While balanced using the flexible member 22, the massage practitioner 24 can effectively and confidently apply a force, e.g., a downward force, due at least partially, to the massage practitioner's own weight, to assist with delivery of force to a patient, by the massage practitioner 24 engaging a portion of the flexible member 22. It is necessary that the massage table remain substantially stationary while the massage is administered to ensure the safety of the patient and the massage practitioner. The best configuration for this would be to place the massage table on the floor. This reduces the risk of the practitioner falling and being injured. This also eliminates the issue of the lack of adequate head clearance between the practitioner's head and the ceiling that can occur with some conventional massage tables with legs.

Figure 2:
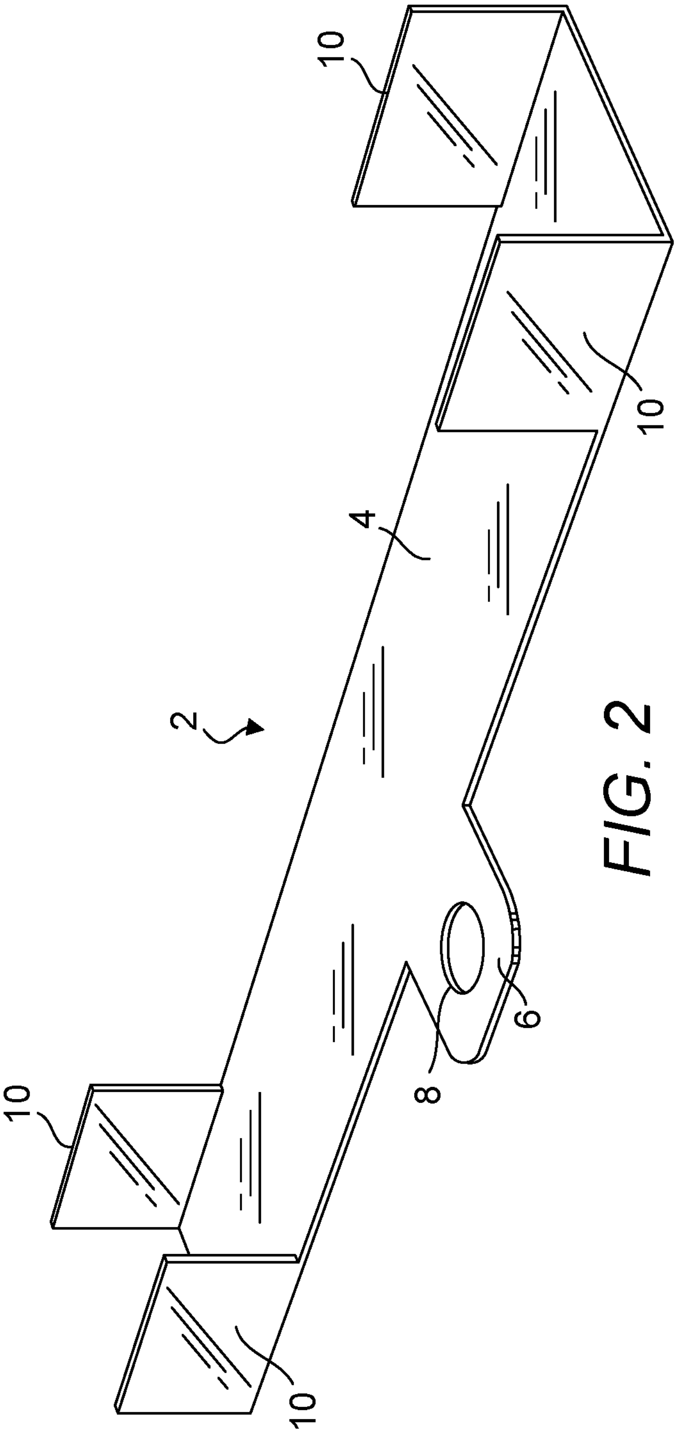
FIG. 2 is a top perspective view of a base member for removably securing a flexible member coupled to a massage table having a frame element.
Figure 3:
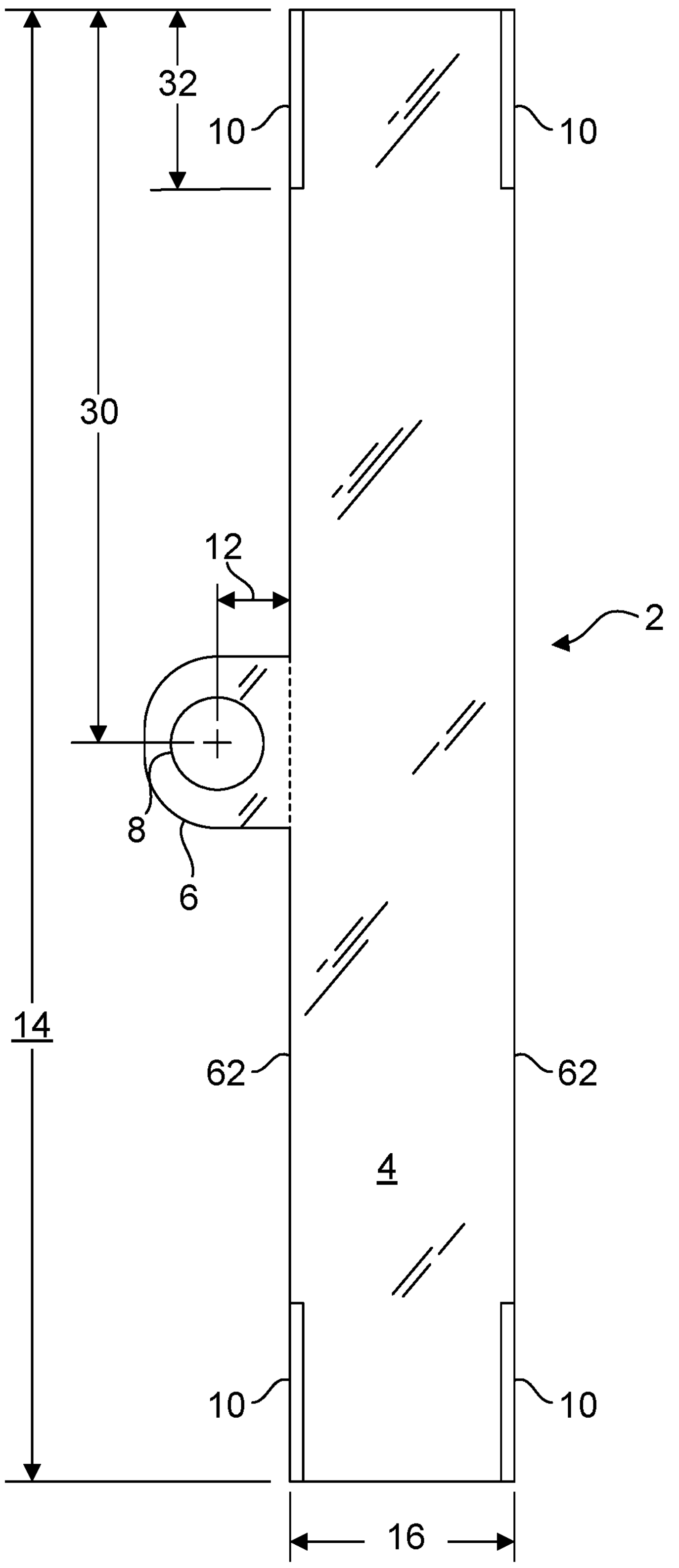
FIG. 3 is a top view of a base member for removably securing a flexible member coupled to a massage table having a frame element.

FIG. 2 is a top perspective view of a base member 2 for removably securing a flexible member coupled to a massage table having a frame element. FIG. 3 is a top view of a base member for removably securing a flexible member coupled to a massage table having a frame element. The base member 2 includes a base 4 and a plurality of anchors 10 configured to extend from four corners of the base 4 to delineate an area defined by a length 14 of base and a width 16 of base. An aperture 8 is disposed in a protrusion 6 of the base 4 through which the flexible member is disposed to removably secure the flexible member. The aperture 8 is preferably disposed at a location that is about half the length 30 of the base 4 from one terminal edge of the base 4. In one embodiment, the base 4 is a plate having a thickness of up to about 0.25 inches and constructed from a material, e.g., steel, aluminum and plastic, etc. Applicant discovered that by constraining the thickness of the base 4, the base 4 does not significantly alter the height of a massage table disposed atop the base 4 while the massage table is in use. In the embodiment shown, the aperture 8 is round and measures about 1.25-1.50 inches in diameter. The aperture 8 need not be round. However, a round-shaped aperture facilitates the insertion of a flexible member as disclosed elsewhere herein. In the embodiment shown, the anchors 10 are plates each with a width 32 of about 3 inches and a height 34 of up to about 1.75 inches. In one embodiment, the aperture center is offset a distance 12 of about 3 inches from the edge of the base 4, and centered at a side edge 62 of the base 4.

Figure 4:
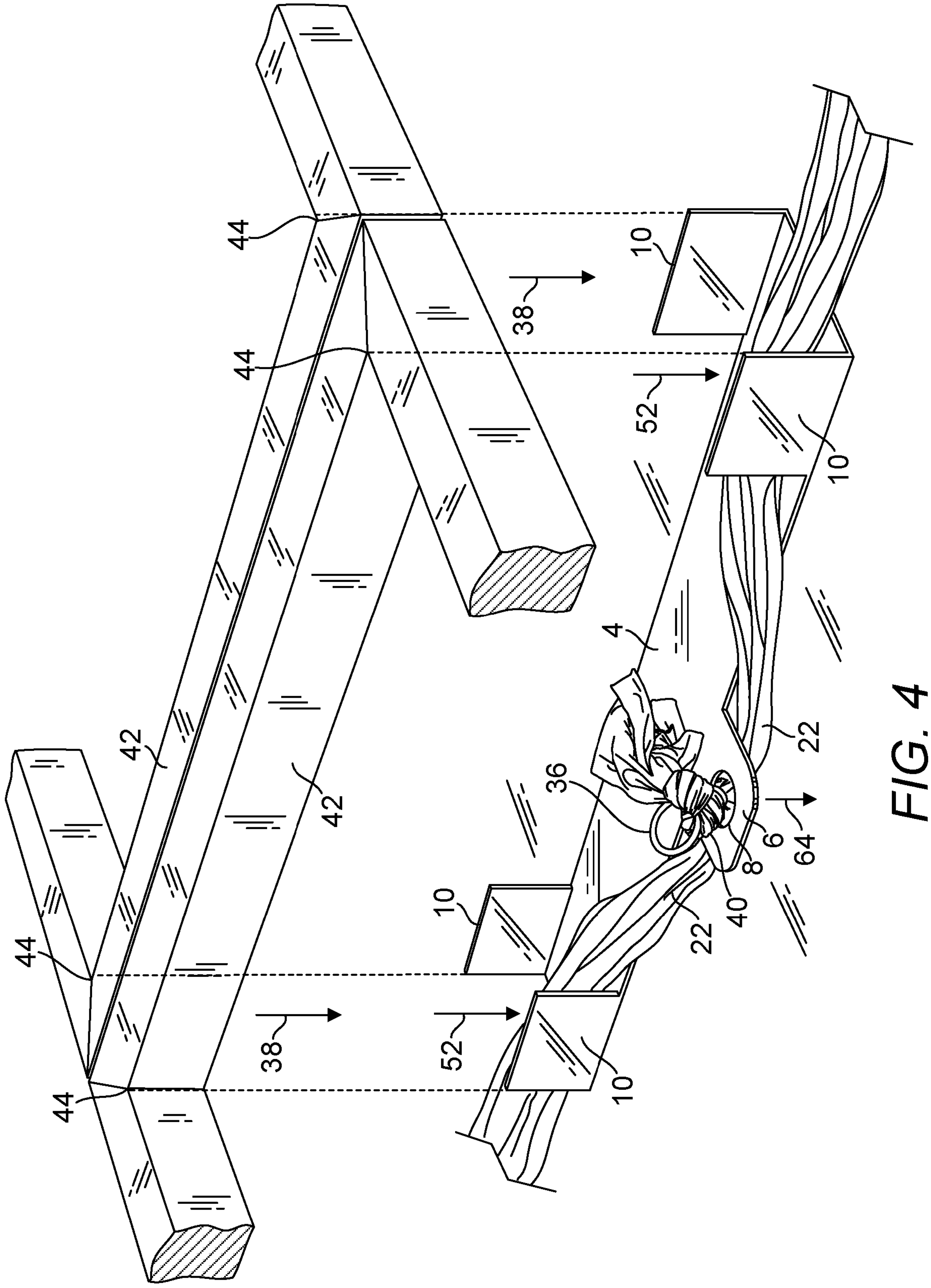
FIG. 4 is a top perspective view of a base member for removably securing a flexible member to the base member coupled to a massage table having a frame element, showing an attached flexible member attached to the base member by placing one end of the infinity loop constructed from the flexible member through the aperture and tying two ends of the flexible member in a knot containing a ring.
Figure 5:
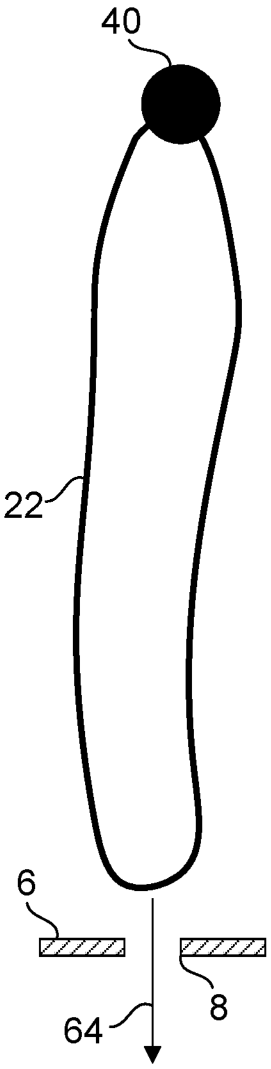
FIG. 5 is a simplified diagram depicting a manner in which a flexible member is threaded through an aperture of the base to secure the flexible member to the base.
Figure 6:
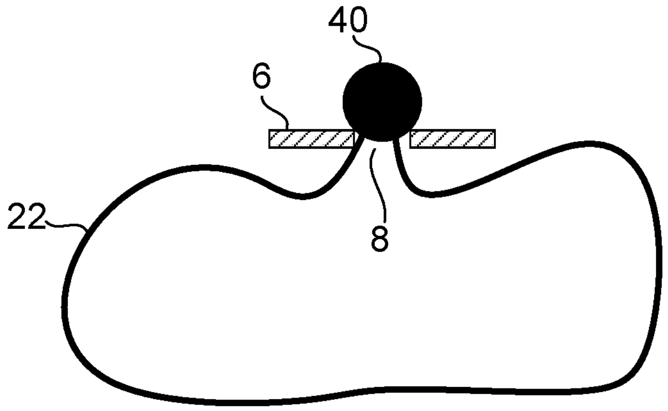
FIG. 6 is a simplified diagram depicting a flexible member having been threaded through an aperture of the base to secure the flexible member to the base.

FIG. 4 is a top perspective view of a base member 2 for removably securing a flexible member 22 to the base member 2 coupled to a massage table having a frame element, showing an attached flexible member 22 attached to the base member 2 by placing the two ends of the flexible member 22 through the aperture 8 and tying them in a knot 40 to form an infinity loop. In the embodiment shown, a ring 36 is additionally coupled to the knot 40, e.g., by the use of one or both ends of the flexible member 22 to further incorporate the ring 36 to make the knot 40 more prominent. In case the knot formed exclusively of the ends of the flexible member 22 unraveled, the knot in which the ring 36 is incorporated serves to prevent complete detachment of the infinity loop from the base member 4. FIG. 5 is a simplified diagram depicting a manner in which a flexible member is threaded through an aperture of the base to secure the flexible member to the base. FIG. 6 is a simplified diagram depicting a flexible member having been threaded through an aperture of the base to secure the flexible member to the base. It shall be noted that, in threading the infinity loop or the flexible member 22, the end of the infinity loop opposite the end of the infinity loop at which the knot 40 is disposed, is gathered and disposed through the aperture 8 of the protrusion 6 in direction 64.

Referring back to FIG. 4, it shall be seen that upon being seated at the aperture 8 in direction 52, the two arms of flexible member 22 about the knot 40 can then be placed within an area delineated by the anchors 10. A massage table 20 can then be positioned such that the frame elements 42 of the two portions of the massage table are inserted into the base member 4 in direction 38 to result in the anchors 10 being disposed at the corners 44 of the frame elements 42. As the flexible member 22 serves as a balance aid for a practitioner as shown in FIG. 1, it is imperative for the flexible member 22 to be securely positioned within reach of the practitioner 24. By positioning the flexible member 22 and the base 4 substantially about the center of the massage table, both the flexible member 22 and the base 4 are immobilized by the weight of the patient and at least partially by the weight of the practitioner. This secures the two portions of the table, and the flexible member together as one unit, allowing the practitioner to administer the massage safely to the patient. In a sanitary massage practice, a clean flexible member is used for each patient. It shall be noted the ease with which a present flexible member 22 can be installed and removed, allows the flexible member to be replaced easily while using the same base 4 between patients. In practice, each flexible member can be preconstructed into an infinity loop, prior to each massage session, and be made available to the practitioner such that the process of replacing a soiled flexible member with a clean flexible member can be minimized or simplified.

Figure 7:
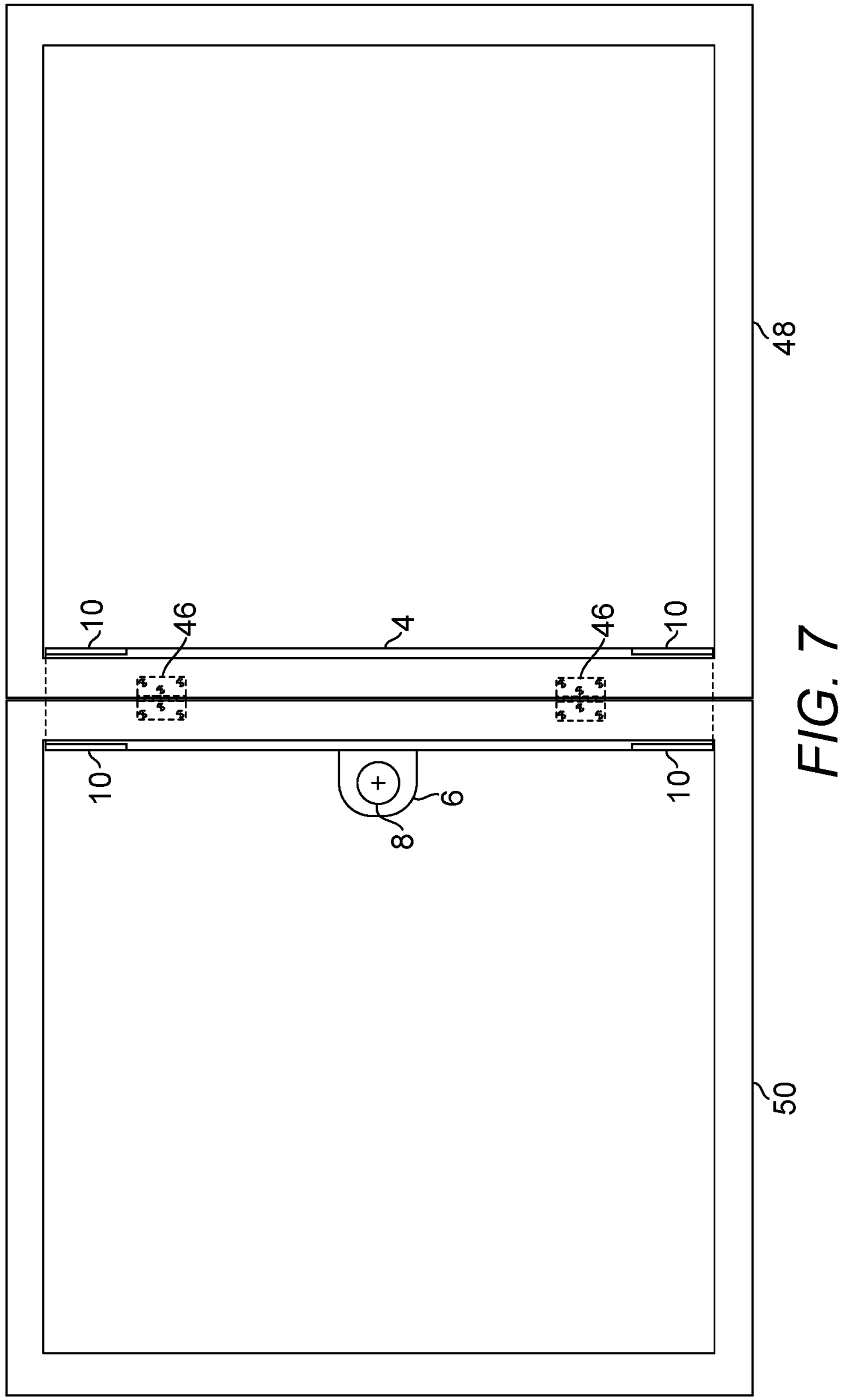
FIG. 7 is a top view of a base member for removably securing a flexible member coupled to a massage table in place, securing the frame members of the two portions of the table hingedly connected by hinges on the bottom surfaces of the frame members.
Figure 8:
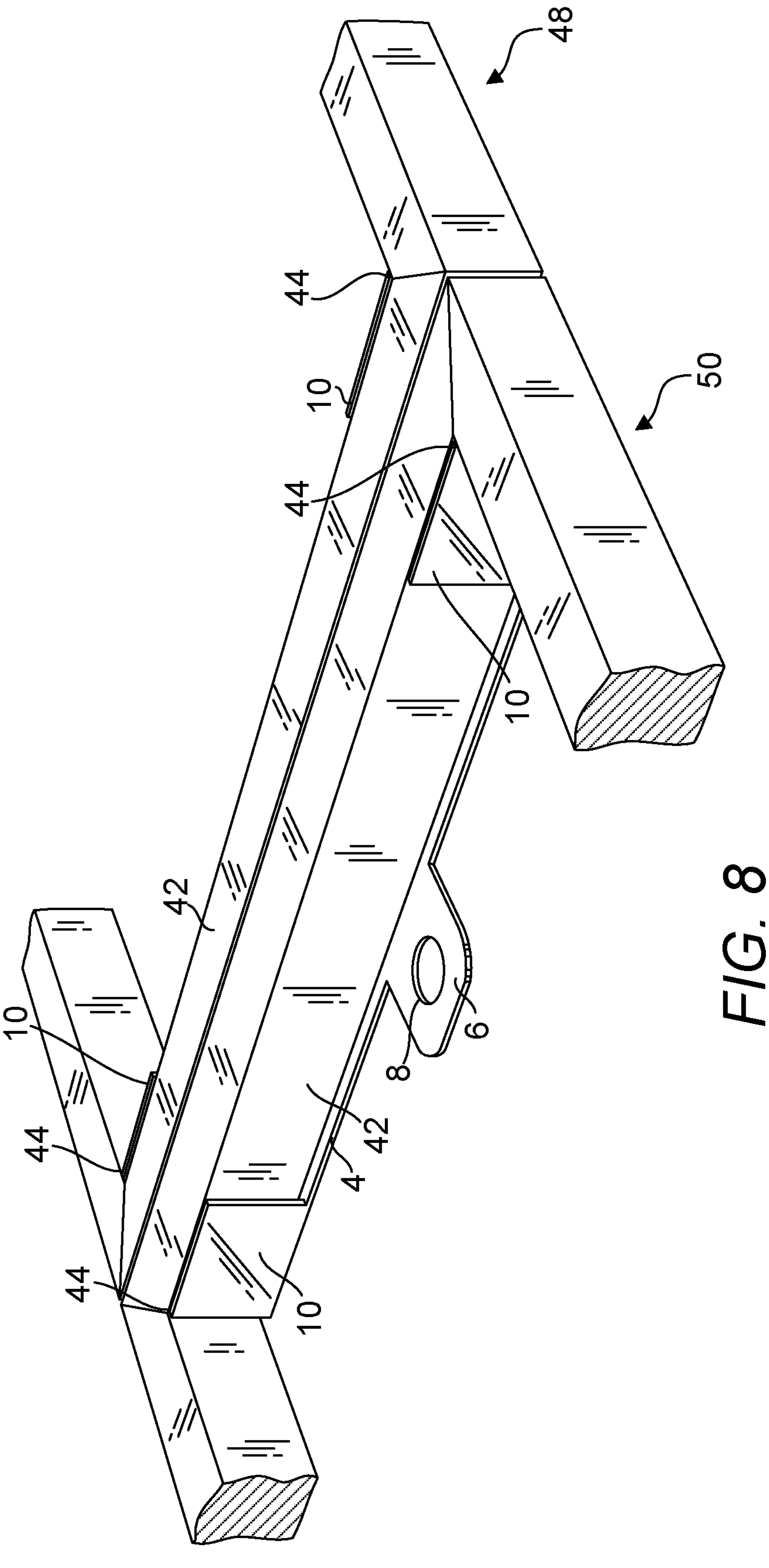
FIG. 8 is a top perspective view of a base member, for removably securing a flexible member coupled to a massage table in place, securing the frame members of the two portions of the table hingedly connected by hinges.

FIG. 7 is a top view of a base member 4 for removably securing a flexible member coupled to a massage table in place securing the frame elements of the two portions 48, 50 of the table. FIG. 8 is a top perspective view of a base member 4 for removably securing a flexible member coupled to a massage table in place securing the frame elements of the two portions 48, 50 of the table. The surfaces of the two table portions are removed to reveal the frame elements 42 and the flexible member is not shown for clarity. The massage table is formed of a first portion and a second portion that are of a similar size such that they may be hingedly connected by hinges 46 and foldable to produce a compact and portable package while not in use.

Figure 9:
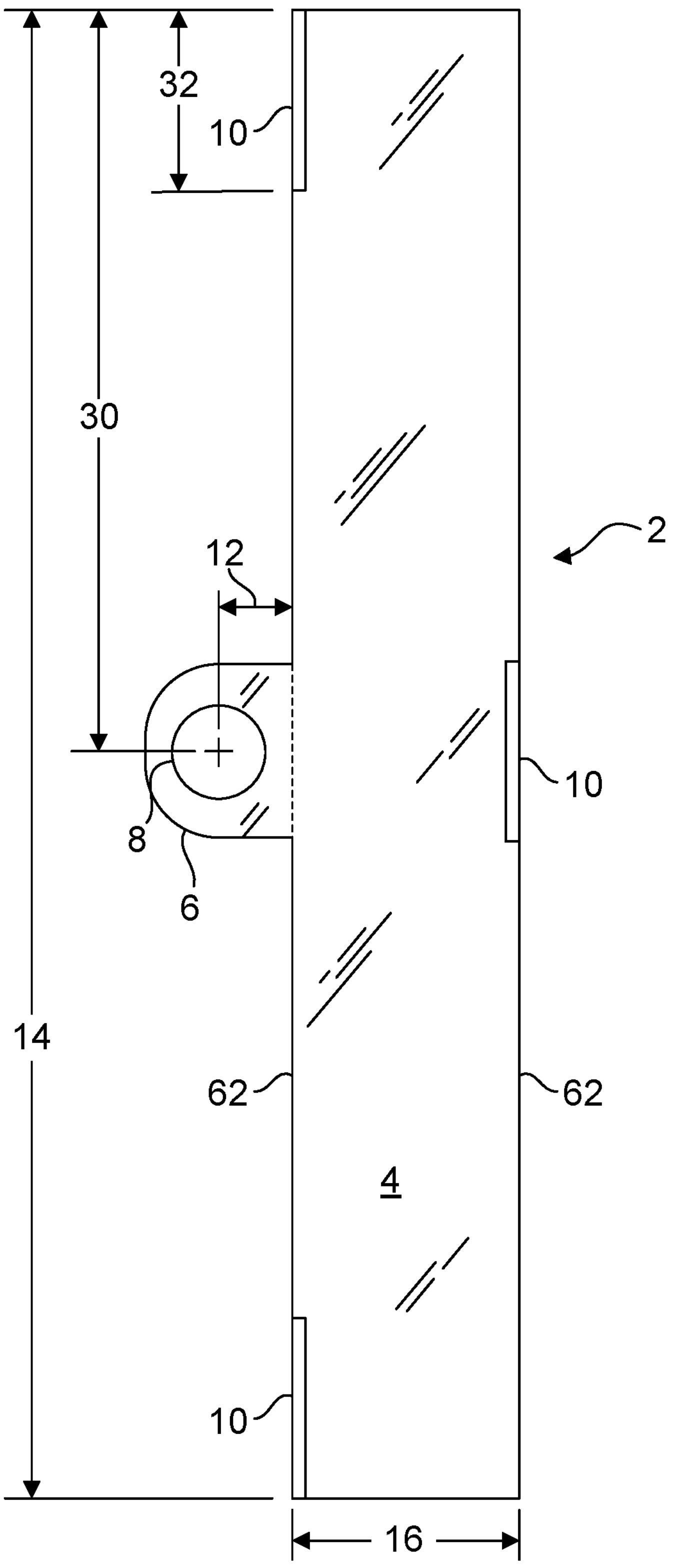
FIG. 9 is a top view of another embodiment of a base member with an alternative number and arrangement of the anchors.

FIG. 9 is a top view of another embodiment of a base member with an alternative number and arrangement of the anchors. In this embodiment, three anchors are shown to constrain the two halves of a massage table. Although not shown, the three anchors 10 can be posts instead of flat plates. Two anchors are configured to be disposed spaced apart at two corners on one longitudinal edge 62 of the base 4 and the third anchor is configured to be placed on the opposite longitudinal edge 62 of the base 4 preferably about equidistant longitudinally between the first two anchors, as shown in FIG. 9. It shall be understood that the third anchor can be placed anywhere along the longitudinal edge 62 including one of the corners.

Figure 10:
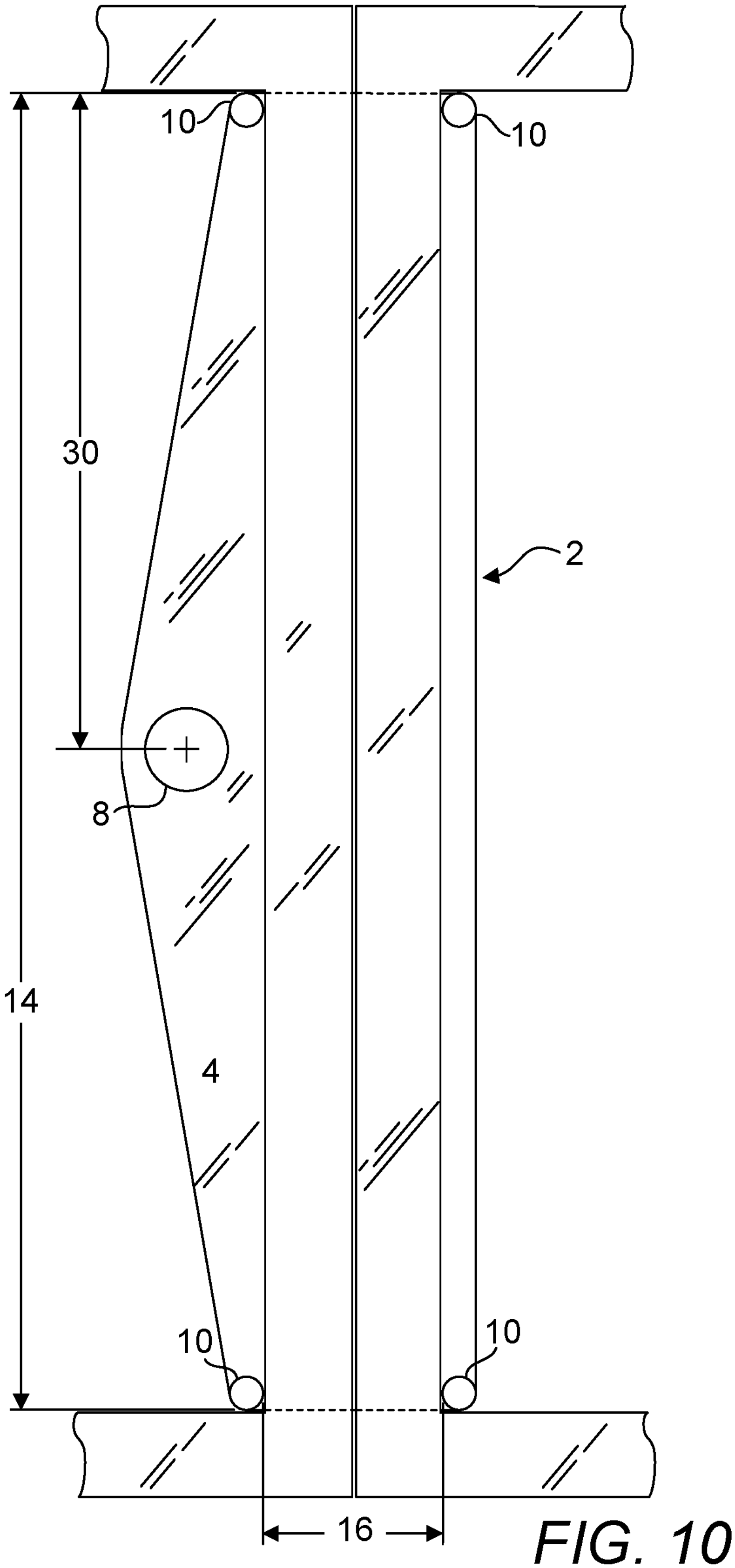
FIG. 10 is a top view of another embodiment of a base member using posts as anchors instead of plates, in securing frame members.

FIG. 10 is a top view of another embodiment of a base member 2 in which the anchors 10 are essentially cylindrical posts instead of flat plates to secure frame elements 42 of the two portions of the table 20. An area delineated by the four posts 10 allows portions of the frame elements 42 to rest snugly within this area. The massage table is again shown with its surfaces removed to reveal the frame elements 42 underneath them. Using posts would allow round stock to easily be fabricated and secured, e.g., to corners as anchors instead of cutting flat plate stock to be welded or bent to form the anchors or otherwise secured to the corners to form the anchors. Again, although not shown, three posts are sufficient to replace the plate anchors 10 as shown in FIG. 9 at locations similar to those suitable for use with the flat plates.

Figure 11:
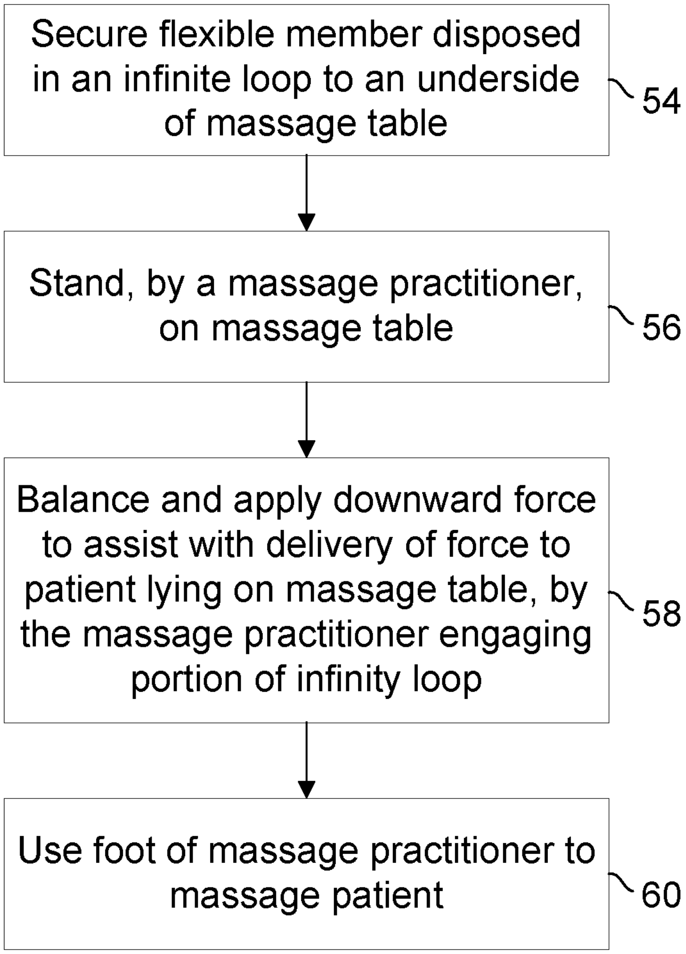
FIG. 11 is a diagram depicting a method useful for carrying out a massage using a flexible member secured to a massage table using a present base member.

FIG. 11 is a diagram useful for summarizing a method useful for carrying out the massage of a patient by a massage practitioner using a present base member. First, the present flexible member that is disposed in an infinite loop, is secured to the underside of a massage table using the present base member, as shown in step 54. Second, the massage practitioner stands on the massage table, as shown in step 56. Thirdly, the practitioner balances himself or herself and applies a downward force to assist with delivery of force to a patient lying on the massage table as the practitioner engages a portion of the infinity loop, as shown in step 58. In the fourth and final step, the massage practitioner uses his or her foot to massage the patient, as shown in step 60.

Figure 12:
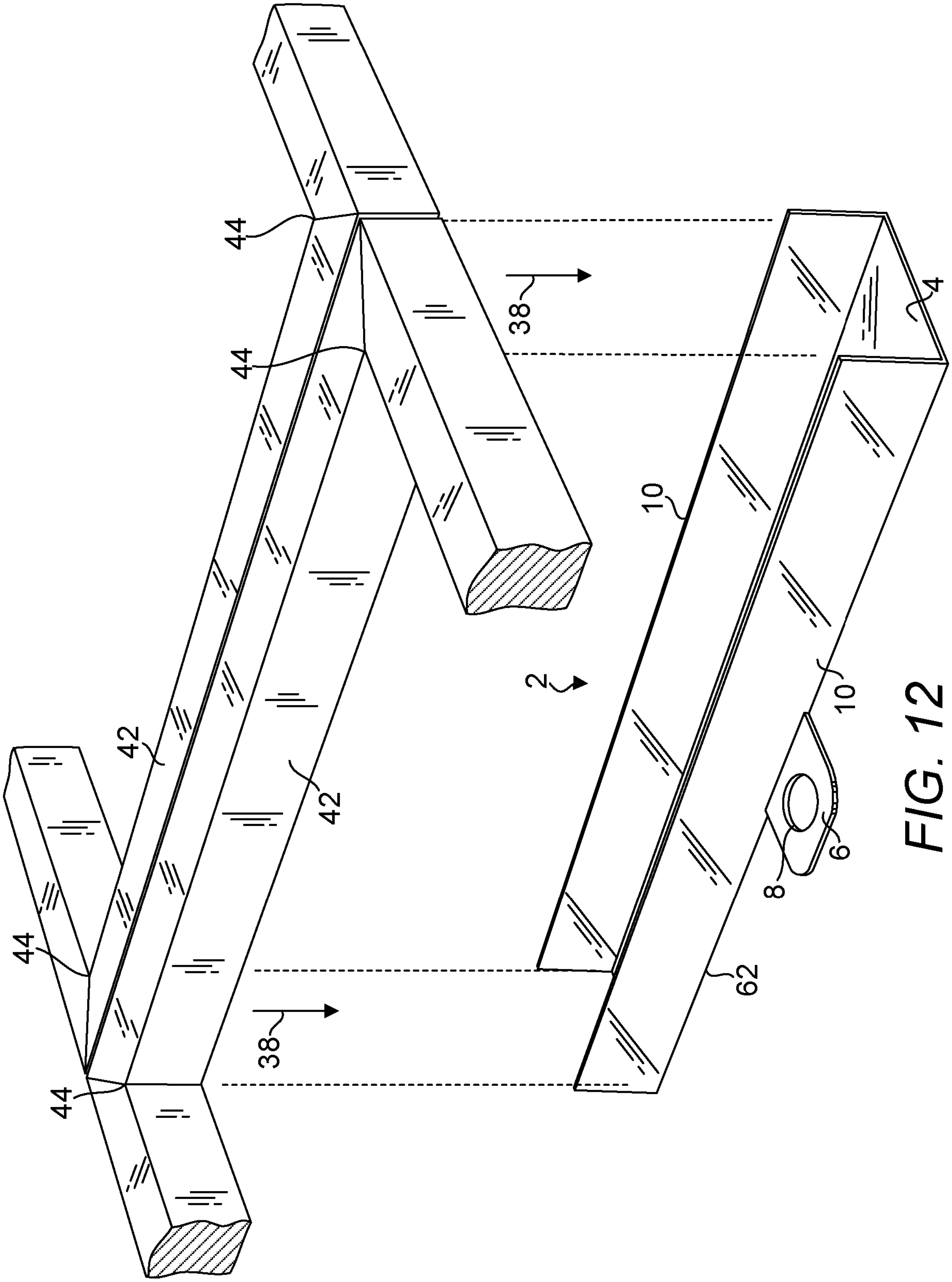
FIG. 12 is a top perspective view of yet another embodiment of a base member for removably securing a flexible member coupled to a massage table having a frame element.

FIG. 12 is a top perspective view of yet another embodiment of a base member 2 for removably securing a flexible member coupled to a massage table having a frame element. Here, only one anchor 10 is used on each side edge 62. Each anchor 10 is shown spanning substantially the entire with length of the base 4. However, when only two anchors are used, only one of the two anchors 10 is required to span substantially the entire length of the base 4 and the other anchor 10 can be a short anchor similar to the short anchor 10 shown in FIG. 9 and disposed in a similar location on a side edge 62 as the location of the short anchor 10 shown in FIG. 9. Referring to both FIGS. 4 and 12, although not shown in FIG. 12, the two arms of a flexible member 22, upon deployment through the aperture 8, can still be disposed atop the base 4 by disposing the arms over an anchor 10. In some aspects, the base member 2 can also be used with the flexible member 22 not having been disposed atop the base 4 to be secured with the frame element of a massage table.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A base member for removably securing a flexible member coupled to a legless table having a frame element, said base member comprising:

(a) a base;

(b) at least two anchors configured to extend from at least two different locations on said base to delineate an area; and (c) a single aperture through which the flexible member is disposed to removably secure the flexible member with portions of the flexible member configured to be disposed within said area, said single aperture is disposed in said base outside of said area, wherein the legless table is positioned with the frame element disposed over the portions of the flexible member upon said area to restrict movement of the portions of the flexible member relative to said base and the legless table relative to the base member and said base is supported on a floor upon which the legless table is disposed to reduce the risk of a user of the legless table falling off the legless table.

2. The base member of claim 1, wherein said at least two anchors is a number of anchors selected from the group consisting of two anchors, three anchors and four anchors.

3. The base member of claim 1, wherein said base is a plate having a thickness of up to about 0.25 inches.

4. The base member of claim 1, wherein said single aperture comprises a diameter and said single aperture measures about 1.25-1.50 inches in diameter.

5. A base member for removably securing a flexible member coupled to a legless table having a frame element, said base member comprising:

(a) a base comprising two side edges, two terminal edges, wherein said two side edges and said two terminal edges together define four corners;

(b) at least two anchors, wherein one of said at least two anchors configured to extend from a first of said two side edges to be disposed at two of said four corners and the other one of said at least two anchors configured to extend from a second of said two side edges;

(c) a protrusion comprises a plate extending substantially co-planarly with said base from one of said two side edges; and (d) a single aperture through which the flexible member is disposed to removably secure the flexible member with, wherein said single aperture is disposed in said protrusion, wherein the legless table is positioned with the frame element disposed within an area outlined by said at least two anchors to restrict movement of portions of the flexible member disposed within said area, relative to said base and the legless table relative to the base member and said base is supported on a floor upon which the legless table is disposed to reduce the risk of a user of the legless table falling off the legless table.

6. The base member of claim 5, wherein said single aperture is configured to be disposed at an offset from said one of said two side edges.

7. The base member of claim 5, further comprising a ring, wherein the flexible member comprises two ends, each end of the flexible member is tied to the ring to form an infinity loop having a knot disposed on a portion of the infinity loop and formed of said two ends of the flexible member, the infinity loop is configured to be threaded through said single aperture with an end of the infinity loop opposite the end the knot is disposed until the threading movement of the flexible member is arrested by at least one of the knot and said ring as the infinity loop continues to be pulled from the end of the infinity loop opposite the end the knot is disposed, the ring is configured to prevent a complete detachment of the flexible member from said base member during use of the flexible member.

8. The base member of claim 5, wherein at least one of said at least two anchors is a plate having a broad face parallel to one of said two side edges.

9. The base member of claim 5, wherein said at least two anchors is a number of anchors selected from the group consisting of two anchors, three anchors and four anchors.

10. The base member of claim 5, wherein said base is a plate having a thickness of up to about 0.25 inches.

11. The base member of claim 5, wherein said single aperture comprises a diameter and said aperture measures about 1.25-1.50 inches in diameter.

12. A method for enabling the use of a legless massage table having a frame element, said method comprising:

(a) threading a flexible member disposed in an infinity loop through a single aperture of a base member until movement of the infinity loop becomes arrested by a knot of the flexible member and placing portions of the infinity loop on the base member before securing the portions of the infinity loop by placing the legless massage table having a frame element atop the base;

(b) standing, by a massage practitioner, on the legless massage table;

(c) balancing and applying a downward force to assist with delivery of force to a patient lying on the legless massage table, by the massage practitioner engaging a portion of the infinity loop; and (d) using a foot of the massage practitioner to massage the patient.

13. The method of claim 12, wherein the massage table is a foldable legless massage table.

14. The method of claim 13, wherein the foldable legless massage table is divided in half longitudinally to define the first half and the second half so that the first half and the second half meet halfway between longitudinal sides of the foldable legless massage table.

* * * * *